(12) United States Patent
Killeen

(10) Patent No.: US 7,655,311 B2
(45) Date of Patent: Feb. 2, 2010

(54) HOMOGENEOUS LOW HARDNESS POLYURETHANE

(75) Inventor: Kelly Ann Killeen, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 199 days.

(21) Appl. No.: 11/185,348

(22) Filed: Jul. 20, 2005

(65) Prior Publication Data

US 2007/0021583 A1 Jan. 25, 2007

(51) Int. Cl.
*B32B 17/40* (2006.01)
*C08G 8/63* (2006.01)

(52) U.S. Cl. .................... 428/423.1; 428/369; 428/906; 528/65; 528/75

(58) Field of Classification Search .................... 528/75, 528/28, 59, 85, 65; 526/224, 318, 279; 428/369, 428/906, 423.1
See application file for complete search history.

(56) References Cited

U.S. PATENT DOCUMENTS

| | | | | |
|---|---|---|---|---|
| 4,835,210 | A * | 5/1989 | Chin et al. | ............ 524/732 |
| 5,804,114 | A | 9/1998 | Janes et al. | |
| 5,874,172 | A | 2/1999 | Beach et al. | |
| 6,042,946 | A | 3/2000 | Massie, II et al. | |
| 6,117,557 | A | 9/2000 | Massie, II et al. | |
| 6,150,025 | A | 11/2000 | Roe et al. | |
| 6,361,484 | B1 | 3/2002 | Chen et al. | |
| 6,451,438 | B1 | 9/2002 | Chiang et al. | |
| 6,780,364 | B2 | 8/2004 | Chiang et al. | |
| 7,151,154 | B2 * | 12/2006 | Killeen et al. | ............ 528/75 |
| 2005/0154102 | A1 | 7/2005 | Gopalanarayanan et al. | |
| 2005/0154149 | A1 | 7/2005 | Beach et al. | |
| 2005/0154173 | A1 | 7/2005 | Beach et al. | |
| 2005/0154174 | A1 | 7/2005 | Killeen et al. | |

OTHER PUBLICATIONS

Rainer Höfer et al. Oleochemical Polyols—A New Raw Material Source for Polyurethane Coatings and Floorings, Journal of Coatings Technology, Jun. 1997, pp. 65-72, vol. 69, No. 869.
Rainer Höfer Oleochemical polyols New raw materials for polyurethane applications, European Coatings Journal, Mar. 2000, (from internet, 16 pages).
Karlheinz Hill, Fats and oils as oleochemical raw materials, Pure Appl. Chem., 2000, pp. 1255-1264, vol. 72, No. 7.

* cited by examiner

*Primary Examiner*—Thao T. Tran

(57) ABSTRACT

This invention employs a polyol derivative of a fatty acid that is reacted into a polyurethane formed also with a urethane prepolymer, a polydiene, and optionally, a curative for crosslinking. The fatty acid moiety becomes a relatively short side chain of the polyurethane formed. In embodiments, the polyol is an ester of the fatty acid. This achieves reduction in hardness of the polyurethane with a homogeneity that provides consistent surface characteristics over an extended period desirable for use for electrophotographic development and the like when the material is used as a developer roller.

9 Claims, No Drawings

HOMOGENEOUS LOW HARDNESS POLYURETHANE

TECHNICAL FIELD

This invention relates to improved urethanes particularly useful as rollers in electrophotography.

BACKGROUND OF THE INVENTION

Certain applications of polyurethanes require both low hardness and highly consistent surface characteristics. A particular example of this is in the use of polyurethanes as roller material for electrophotography, such as developer rollers, for which inconsistent or contaminated surfaces result in poor print quality.

In electrophotography the developer roll functions to develop a layer of toner onto a charged photoconductor drum. The toner is metered onto the surface of the developer roll via a doctor blade. The electrical properties of the developer roll assist in the electrostatic transfer of charged toner from the roller surface to the photoconductor drum. The use of a two layer, "coated" roll will develop a fixed quantity of toner per volt of development bias that is determined by the dielectric thickness of the photoconductor, the toner, and the developer roll. This development characteristic is independent of process speed, within limits.

In contrast, a solid roll of a single resistivity develops a quantity of toner based on the dielectric constants of the photoconductor and the toner, and the resistance of the roll in the photoconductor nip, which is dependent on process speed. In addition, a two-layer roll has a longer time constant than a single layer roll. As a result, the two-layer rolls have a higher effective development surface at the entry to the photoconductor nip. This improves the single pel dot print performance of the roll. Therefore, the print performance of a two-layer roll is superior to that of a single-layer roll across a wide process speed range and is less sensitive to varying environmental conditions. The desired electrical properties of a two-layer roll are; a core resistivity less than $1 \times 10^9$ ohm-cm, preferably less than $3 \times 10^8$ ohm-cm, at 22° C. and 50% relative humidity (RH), a coating resistivity of $5 \times 10^9$ to $2 \times 10^{12}$ ohm-cm, preferably $1 \times 10^{11}$ to $5 \times 10^{11}$ ohm-cm, at 22° C. and 50% RH and a coating thickness of approximately 30-200 μm, preferably around 100 μm. The time constant should be 5-2000 milliseconds, preferably about 100 milliseconds, at 22° C. and 50% RH.

As is now well established in the prior art, a resistive surface layer can be produced on a cast urethane roll by baking in air at an elevated temperature. The oxidation of polybutadiene, in the presence of certain conductive metal salts, produces a highly resistive layer at the surface of the roll. The thickness and resistivity of this layer can be adjusted by varying the polybutadiene and metal salt concentrations in the urethane, the baking time, the baking temperature, and the concentration of oxygen.

A softer, more compliant roller is less susceptible to showing non-uniformities due to a more uniform nip at the interfaces of the developer roll with both the doctor blade and the photoconductor drum. Typically, a plasticizer is added to reduce roller hardness. However, such a material is not reacted into the polymer matrix and is free to migrate throughout the rubber roller including to the surface. At the roller surface such additives will interact with the toner causing it to coalesce in the nip area of the developer roll and the photoconductor drum. Reactive high molecular weight polyols have been demonstrated to lower the hardness of polyurethanes, however, conventional α,ω-telechelic curatives in which the OH functional groups are located at opposite ends of the polymer chain afford materials of increased compression set, severely limiting their utility in roller applications. It has been demonstrated that addition of high molecular weight graft polyols, which react into the polymer backbone, decreases the hardness of the roller without compromising the low compression set characteristics.

As the number and variety of polyurethane curatives in each roll formulation increase, however, so do issues of curative compatibility and immiscibility, which often result in a phase separation of the components within the cured polyurethane matrix. This separation causes domains or defects within the roll and on the roll surface termed "potholes."

SUMMARY OF THE INVENTION

This invention employs an added moiety that is reacted into a polyurethane formed also with a urethane prepolymer, a polydiene, and optionally, a curative for cross-linking, such as a trifunctional polyol. This added moiety is a polyol derivative of a saturated or unsaturated fatty acid. The polyurethane is the reaction product of a urethane precursor, a polydiene, optionally, a curative, and the polyol derivative of a fatty acid. The fatty acid moiety becomes a relatively short side chain of the polyurethane formed. In embodiments, the polyol is an ester of the fatty acid.

This invention achieves reduction in hardness of the polyurethane with a homogeneity that provides consistent surface characteristics over an extended period desirable for use for electrophotographic development and the like. In a developer roller, a metal salt and other ingredients will be added as is established technology and the material is baked to produce an oxidized outer layer of increased resistivity.

The term oleochemical ester polyol in this description and claims means than esterfied fatty acid in which the fatty acid-derived portion may or may not have hydroxyl substituents or be unsaturated and in which the other ester moiety has at least two hydroxyl substituents in addition to the linkage forming the ester.

DESCRIPTIONS OF THE PREFERRED EMBODIMENTS

Roll formulations containing oleochemical polyol curatives demonstrate significant reductions in size and number of pothole defects and at the same time maintain desirable hardness and compression set properties. Oleochemical polyol curatives can also act as internal plasticizers, affording polyurethane elastomers with increased compliance, yet, being cured into the polyurethane matrix, such materials avoid the issues of migration associated with conventional plasticizing additives.

This invention encompasses the composition of a cast urethane rubber exhibiting low compression set and low hardness, made with oleochemical polyol curatives. For the purpose of this invention, an acceptable compression set is less than or equal to 8% as measured by ASTM D395-89 using method B and exposed to 70° C. for 22 hours, and the hardness should be less than 50 Shore A as measured by ASTM D2240-86.

This polyurethane can be used in a developing roller for electrophotographic printing applications, where the lower hardness or increased compliance allows more uniform toner distribution during the functional life of the printer. More specifically, this invention describes a cast urethane rubber comprising an oleochemical polyol, a polydiene, either as a polyol or a urethane prepolymer, blended with a polyurethane prepolymer, optionally one or more additional curatives including graft-curatives, conductive additive or additives, and an antioxidant.

The blend of materials is cast into a mold around a conductive metal shaft to form a roll, cured at a high temperature, processed via grinding to the required functional dimensions, and then baked at an elevated temperature (>80° C.) to oxidize the surface of the roll. This controlled oxidation produces a high resistivity layer of material on the surface of the roll. The desired electrical properties of rolls prepared in this manner are; a core resistivity less than $1 \times 10^9$ ohm-cm, preferably less than $3 \times 10^8$ ohm-cm, at 22° C. and 50% relative humidity (RH), a surface layer resistivity of $5 \times 10^9$ to $2 \times 10^{12}$ ohm-cm, preferably $1 \times 10^{11}$ to $5 \times 10^{11}$ ohm-cm, at 22° C. and 50% RH, and a surface layer thickness of approximately 30-200 μm, preferably around 100 μm. The time constant should be 5-2000 milliseconds, preferably about 100 milliseconds, at 22° C. and 50% RH.

Non-limiting examples of oleochemical polyols include those materials described in the article "Oleochemical Polyols—A new Raw Material source for Polyurethane Coatings and Floorings," by Rainer Hofer et al, *Journal of Coating Technology*, vol. 69, no. 869, June 1997, pp. 65-72. Preferred structures include saturated and unsaturated fatty acid esters of polyols such as glycerol, polyglycerol, trimethylol propane, pentaerythritol, sugars, and sugar derivatives such as sorbitan. More preferred fatty acid esters are glycerol monooleate (PANALITE® 90-130, ADM; DIMODAN® MO 90, Danisco), polyglycerol monooleate (GRINDSTED® PGE O 80, Danisco), pentaerythritol monooleate (EXCEPARL PE-MO, Kao Corp.), sorbitan monostearate, and sorbitan monooleate.

Also preferred are dimer diols (PRIPOL® 2033, Uniqema), complex mixtures consisting primarily of C36 diols resulting from the dimerization and hydrogenation of unsaturated C18 fatty acids.

The oleochemical polyol comprises about 0.5-15% by weight of the final urethane, preferably 1-10% and most preferably 2-8%.

In order to produce a roll with a high resistivity surface layer, a polydiene, such as polybutadiene, must be included in the formulation. The polydiene can be added in either a diisocyanate or a diol form. Polybutadiene prepolymers are prepared by the reaction of a polybutadiene diol with a diisocyanate such as toluene diisocyanate (TDI). This prepolymer can be blended with other prepolymers in various proportions. Typical prepolymer/polybutadiene prepolymer blend ratios range from 95/5 to 60/40 parts by weight. Alternatively, a polydiene diol may be used. Particularly preferred is polybutadiene diol (PolyBD® R-45HT, Elf Atochem), an α,ω-telechelic polybutadiene diol with a molecular weight, Mn, of 2,800 and a microstructure of 20% cis-1,4-polybutadiene, 60% trans-1,4-polybutadiene and 20% 1,2-vinyl-polybutadiene.

Various isocyanate sources may be used as outlined in references 1-7. For ease of manufacturing, a urethane prepolymer(s) is preferred such as a polyester or polycaprolactone polymer terminated with various diisocyanates such as toluene diisocyanate (TDI) or methyl diphenyl diisocyanate (MDI). For example, VERSATHANE® A7QM (Air Products) which is a polyester type, and VIBRATHANE® 6060 (Crompton Uniroyal) which is a polycaprolactone, can be used. Polycaprolactone urethane prepolymers, such as VIBRATHANE® 6060, are preferred because of their stable electrical resistivity with temperature and humidity changes.

Additional curatives may be added as needed to achieve the required physical properties of the urethane elastomers. Curatives must comprise at least di-functionality to act as chain extenders, and tri-functionality to act as cross-linkers or to promote networking within the matrix, functional groups being generally defined as groups comprising active hydrogens, for example amines or hydroxyls. Exemplary curatives include; polycaprolactone polyols such as the TONE® materials, products of Union Carbide Corp., polyether diols or triols, such as VORANOL® (Dow Chemical Co.), Poly-G®, Poly-Q® (Arch Chemical, Inc.) and PLURACOL® (BASF), polyester diols such as FOMREZ® (Witco Corp.), polydimethylsiloxane diols such as FM-4411, and polydimethylsiloxane diamines such as FM-3311 or FM-3321 all from Chisso Corp. Preferred curatives include Polyol TP30® (Perstorp), a trifunctional polyether polyol, and triisopropanol amine (TIPA), which improves the hydrolytic stability of the urethane elastomers described herein. Also preferred are graft polymer curatives such as those described in commonly-owner U.S. patent publications 2005/0154149 A1 of Beach et al., 2005/0154173 A1 of Beach et al, and 2005/0154174 of Killeen et al., all filed Jan. 13, 2004.

The fatty acid moiety side chains of this application have number average molecular weight (Mn) of about 250. Graft polymer curatives are defined as comprising a side chain having a number average molecular weight (Mn) of greater than about 500 and a main chain having an Mn of less than about 200 and at least di-functionality. Non-limiting examples of graft polymer curatives include polydimethylsiloxane diols such as FM-DA11 and FM-DA21 (Chisso Corp.) and acrylate polyols such as curatives 1 and 2 from of the foregoing publication 2005/0154174 A1.

One or more conductive metal salts are added to the urethane to reduce the electrical resistivity of the roll core to $<1 \times 10^9$ ohm-cm. It is also required that at least one of the metal salts be capable of catalyzing the oxidation of polydiene in air at elevated temperatures (>80° C.) to assist in the formation of a highly resistive layer at the surface of the roll (Ref. 1-2). Suitable metals salts include, but are not limited to, ferric chloride, ferrous chloride, calcium chloride, and cobalt hexafluoroacetylacetonoate. Particularly preferred is ferric chloride.

As is known, an antioxidant can be added to the urethane. The antioxidant material may be chosen from the major classes of antioxidants standard to the rubber industry, for example aromatic amines, hindered phenols or a hydroperoxide decomposer such as phosphate or sulfide. Particularly preferred is the hindered phenol, 2,6-di-t-butyl-4-methylphenol (BHT).

EXAMPLES

The ingredients as set forth in the examples below are mixed to form polyurethane elastomers. Polyurethanes are prepared using a 0.95 stoichiometric ratio of —OH to —NCO, except where noted. The urethane prepolymer and diol curatives are independently warmed to 75° C. and degassed in a vacuum oven prior to mixing. Trifunctional curatives, Polyol TP30® and triisopropanol amine (TIPA), are added to the formulation at ambient temperature immediately prior to molding. Ferric chloride is added as a solution in Polyol TP30®. The mixture is cast into a mold about a metal shaft, optionally coated with a conductive primer, then cured at 104° C. for about 16 hours total time, using a combination of curing in the mold, demolding, and post-curing, to produce a polyurethane elastomeric roll. The roll is ground to intermediate dimensions prior to the post-curing step. After any post-cure, the roll is ground to the precise functional dimensions. A resistive layer is produced on the ground roll via an oxidative baking process in which the rolls are baked in air at an elevated temperature for some length of time. Conditions for the oxidative bake process are formulation dependent and are listed with each example.

Solid cylindrical "button" samples (height=12 mm, diameter=129 mm) of each urethane formulation are prepared concurrently by casting the formulation into button molds followed by subsequent curing, demolding, post-curing, and oxidative baking as described for the rolls above. Hardness and compression set are reported for the button samples of the inventive elastomers because they most closely reflect the properties of the elastomer itself, unlike roll hardness, which is dependent on factors such as roll geometry and shaft properties, in addition to the properties of the elastomer.

Example 1

| Ingredient | Percent by Weight |
| --- | --- |
| Polycaprolactone ester/TDI prepolymer | 72.17% |
| Polybutadiene diol + BHT | 12.33% |
| Trifunctional polyether polyol (Polyol TP30 ®) | 2.25% |
| Poly(butylacrylate) graft diol (Example 1, of the foregoing publication 2005/0154174) | 10.99% |
| Glycerol monooleate | 2.00% |
| Ferric chloride | 0.16% |
| Triisopropanolamine | 0.10% |
| Total | 100.00% |

Oxidative bake process: 10 hours at 120° C.

Example 2

| Ingredient | Percent by Weight |
| --- | --- |
| Polycaprolactone ester/TDI prepolymer | 74.49% |
| Polybutadiene diol + BHT | 12.40% |
| Trifunctional polyether polyol (Polyol TP30 ®) | 2.25% |
| Poly(ethylhexylacrylate) graft diol (Example 2, of the foregoing publication 2005/0154174) | 8.60% |
| Glycerol monooleate | 2.00% |
| Ferric chloride | 0.16% |
| Triisopropanolamine | 0.10% |
| Total | 100.00% |

Oxidative bake process: 10 hours at 120° C.

Example 3

| Ingredient | Percent by Weight |
| --- | --- |
| Polycaprolactone ester/TDI prepolymer | 77.73% |
| Polybutadiene diol + BHT | 12.40% |
| Trifunctional polyether polyol (Polyol TP30 ®) | 2.00% |
| Polyglycerol monooleate | 7.60% |
| Ferric chloride | 0.17% |
| Triisopropanolamine | 0.10% |
| Total | 100.00% |

Stoichiometric ratio 1.25 —OH/—NCO; Oxidative bake process: 8 hours at 110° C.

Example 4

| Ingredient | Percent by Weight |
| --- | --- |
| Polycaprolactone ester/TDI prepolymer | 80.57% |
| Polybutadiene diol + BHT | 12.40% |
| Trifunctional polyether polyol (POLYOL TP30 ®) | 2.00% |
| Polyglycerol monooleate | 4.76% |
| Ferric chloride | 0.17% |
| Triisopropanolamine | 0.10% |
| Total | 100.00% |

Oxidative bake process: 8 hours at 110° C.

Comparative Example A

| Ingredient | Percent by Weight |
| --- | --- |
| Polycaprolactone ester/TDI prepolymer | 64.38% |
| Polybutadiene diol + BHT | 12.33% |
| Trifunctional polyether polyol (Polyol TP30 ®) | 2.53% |
| Poly(butylacrylate) graft diol (Example 1 of the foregoing publication 2005/0154174) | 20.52% |
| Ferric chloride | 0.14% |
| Triisopropanolamine | 0.10% |
| Total | 100.00% |

Oxidative bake process: 10 hours at 120° C.

Comparative Example B

| Ingredient | Percent by Weight |
| --- | --- |
| Polycaprolactone ester/TDI prepolymer | 69.99% |
| Polybutadiene diol + BHT | 12.33% |
| Trifunctional polyether polyol (Polyol TP30 ®) | 2.58% |
| Poly(ethylhexylacrylate) graft diol (Example 2, of the foregoing 2005/0154174 A1) | 14.85% |
| Ferric chloride | 0.15% |
| Triisopropanolamine | 0.10% |
| Total | 100.00% |

Oxidative bake process: 10 hours at 120° C.

Comparative Example C

| Ingredient | Percent by Weight |
| --- | --- |
| Polycaprolactone ester/TDI prepolymer | 82.68% |
| Polybutadiene diol + BHT | 12.39% |
| Trifunctional polyether polyol (Polyol TP30 ®) | 4.66% |
| Ferric chloride | 0.17% |
| Triisopropanolamine | 0.10% |
| Total | 100.00% |

Oxidative bake process: 10 hours at 100° C.

The inventive rolls are characterized by a variety of electrical techniques. Generally, a conductive media such as conductive carbon paint or tape is applied in a strip down the surface of the roll. Attaching electrical contacts to the conductive carbon tape and the roll shaft completes a circuit. The direct current resistivity of the roll at 100 volts, the time constant, and the alternating current resistivity of the roll at 1 kHz are measured. The time constant is measured by applying a 100 volt bias to the roll, removing the voltage, then measuring the time for the voltage on the roll to decay to 1/e (~37%) of its original value. This time constant is related to the resistivity and thickness of the surface layer on the roll. The roll is modeled as two parallel RC circuits in series. One RC circuit represents the core and the second represents the resistive surface layer. U.S. Pat. No. 5,804,114 to Janes et al. describes in detail the theory behind these relationships and the applicable equations that result. Surface layer resistivity ($Rho_c$), surface layer thickness ($T_c$), and bulk resistivity ($Rho_b$) for the exemplary rolls were measured at 22° C. and 50% relative humidity and the results are reported in Table 1. Desirable electrical property ranges for the inventive rolls include; $Rho_c$ from about $5 \times 10^9$ to about $2 \times 10^{12}$ Ohm-cm, preferably between $1 \times 10^{11}$ and $5 \times 10^{11}$ Ohm-cm; $T_c$ from about 50 to about 200 microns; and $Rho_b$ less than about $1 \times 10^9$ Ohm-cm, preferably less than $3 \times 10^8$ Ohm-cm.

Using a Shore A durometer, button hardness is measured according to ASTM Method D2240-86. A typical roll is 2-5 Shore A units harder than the corresponding button sample. The compression set is measured according to ASTM D395-89, method B. Under this test method, the buttons are subjected to a 25% compression (height) at 70° C. for 22 hours and the resultant permanent set is measured at room temperature. Uniformity of the polyurethane elastomers is evaluated using scanning electron microscopy (SEM) by measuring the size of phase separated domains in cross sectional images of each button sample. Samples are rated on a scale of A to D, in which A indicates domain sizes $\leq 5$ μm, B 5-10 μm, C 10-20 μm, and D>20 μm. Hardness, compression set, and uniformity ratings are listed in Table 1 for all examples.

TABLE 1

Roll/Button Electrical and Physical Properties

|   | $Rho_c$ (Ohm-cm) | Tc (μm) | $Rho_b$ (Ohm-cm) | Hardness (Shore A) | Compression Set | Uniformity Rating |
|---|---|---|---|---|---|---|
| 1 | $9.7 \times 10^{10}$ | 75 | $8.8 \times 10^7$ | 44 | 4.2 | B |
| 2 | $1.5 \times 10^{11}$ | 85 | $7.9 \times 10^7$ | 44 | 4.4 | A |
| 3 | $2.5 \times 10^{11}$ | 94 | $1.3 \times 10^8$ | 37 | 5.7 | A |
| 4 | $4.4 \times 10^{11}$ | 120 | $1.3 \times 10^8$ | 48 | 1.7 | A |
| A | $2.0 \times 10^{11}$ | 64 | $8.3 \times 10^7$ | 42 | 3.5 | C |
| B | $1.1 \times 10^{11}$ | 73 | $8.1 \times 10^7$ | 41 | 3.6 | C |
| C | $2.5 \times 10^{11}$ | 114 | $1.1 \times 10^8$ | 55 | <2 | A |

In examples 1-4 we observe improved uniformity and/or increased compliance (decreased hardness) relative to the related comparative examples A-C prepared without oleochemical polyol curatives, yet maintain desirable compression set and electrical properties.

It will be apparent that alternative long chain polyols of fatty acids may be employed where the polyol group is at least difunctional and reacts with the elements of the urethane polymer formed.

What is claimed is:

1. A homogeneous low hardness polyurethane characterized by being the reaction product of a urethane prepolymer, a polydiene, and a polyol derivative of a fatty acid, and, optionally, a graft diol curative, the urethane prepolymer comprising from 60 to 95 parts by weight of the reaction product.

2. The polyurethane of claim 1 in which said polyol is an oleochemical ester polyol.

3. The polyurethane of claim 2, in which said ester is glycerol monooleate.

4. The polyurethane of claim 2, in which said ester is polyglycerol monooleate.

5. A roller comprising the reaction product of a urethane prepolymer, a polydiene, and a polyol derivative of a fatty acid and, a graft diol curative, and also comprising a metal salt, said roller having an oxidized outer layer when cured and baked at an elevated temperature of greater than 80° C.; and said urethane prepolymer comprising from 60 to 95 parts by weight of the reaction product.

6. The polyurethane of claim 5 in which said polyol is an oleochemical ester polyol.

7. The polyurethane of claim 6 in which said ester is glycerol monooleate.

8. The polyurethane of claim 7, also comprising in said reaction product a poly(ethylhexylacrylate) graft diol.

9. The polyurethane of claim 6 in which said ester is polyglycerol monooleate.

* * * * *

UNITED STATES PATENT AND TRADEMARK OFFICE
CERTIFICATE OF CORRECTION

PATENT NO. : 7,655,311 B2 Page 1 of 1
APPLICATION NO. : 11/185348
DATED : February 2, 2010
INVENTOR(S) : Kelly Ann Killeen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Signed and Sealed this

Twenty-eighth Day of December, 2010

David J. Kappos
*Director of the United States Patent and Trademark Office*